H. B. MIGLIAVACCA.
AUTOMATIC CHECK VALVE FOR INFLAMMABLE GASES.
APPLICATION FILED JUNE 12, 1911.
1,030,911.
Patented July 2, 1912.
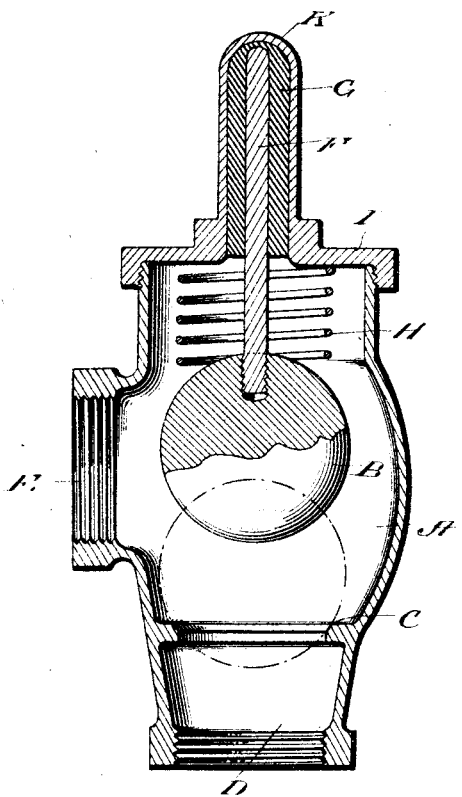
Witnesses
Inventor
Henry B. Migliavacca.
By
Attorneys

UNITED STATES PATENT OFFICE.

HENRY B. MIGLIAVACCA, OF NAPA, CALIFORNIA.

AUTOMATIC CHECK-VALVE FOR INFLAMMABLE GASES.

1,030,911.  Specification of Letters Patent. Patented July 2, 1912.

Application filed June 12, 1911. Serial No. 632,686.

*To all whom it may concern:*

Be it known that I, HENRY B. MIGLIAVACCA, a citizen of the United States, residing at Napa, in the county of Napa and State of California, have invented certain new and useful Improvements in Automatic Check-Valves for Inflammable Gases; and I do hereby declare the following to be a full, clear, and exact description of the invention, such as will enable others skilled in the art to which it appertains to make and use the same, reference being hereby made to the accompanying drawings, forming part of this specification.

This invention relates to a 'safety gas valve, and is adapted to be placed between the service pipe into the building and the gas meter, and to automatically cut off the flow of gas from the service pipe to the gas meter when the temperature surrounding the valve shall have been raised to a predetermined degree, either by fire or other heat-producing causes.

As these valves may not be operated for a great many years, it is essential that they shall be so constructed as to be able to remain for years in an inactive condition and yet be certain to operate when they are sufficiently heated. Furthermore it is essential that these valves be composed of very few parts and not liable to get out of order or fail to work when desired.

By my invention I have produced a valve which fulfils all of the above requirements and which, in addition, is very cheap to construct.

Referring to the drawings wherein I show in central longitudinal section the preferred form of my invention, and wherein the same part is designated by the same reference characters wherever it occurs A designates a chamber having an inlet opening D threaded to receive the service pipe, and an outlet E in its side threaded for connection to the gas meter. In the lower portion of the chamber I provide the valve seat C which is formed by a flanged ring extending inwardly from the walls of the chamber. Mounted on top of the chamber is the cap I which has the centrally located extension K, into which extends the stem F, which carries at its lower end the heavy metallic ball B. The ball B is of such a size as to act as a valve when in contact with the valve seat C, and close the passage from the inlet D to the outlet E, the weight of the ball being sufficient to overcome the gas pressure beneath the same.

H is a spring which I preferably interpose between the top of the ball B and the lower side of the cap I. This spring is for the purpose of aiding the movement of the ball to its seat, but is not essential to the assembling of the device. In operation the cap I is removed from the top of the chamber A, the stem F is inserted in the extension K after the spring H has been placed in position, and the end of the stem forced to the bottom of the extension. Metal G which will fuse at the temperature at which it is desired to have the valve operate is now run into the extension, filling the same, whereupon the stem will be firmly held in the extension and the ball held in its upper position. The cap is now secured in place on the chamber, and the device is ready to operate whenever sufficient heat is generated around the same to fuse the metal G.

In the operation of the device as soon as the metal G is fused the ball moves down onto its seat. Should however the spring have weakened by remaining so long under tension, or have broken, this will not interfere with the operation of the valve, as the ball itself has sufficient weight to move to its seat without the assistance of a spring. The stem extending up into the extension guides the ball to its seat. As the valve stem is of such a length as to always remain in the extension K, the stem will act to prevent any rotation or material movement of the ball on its seat.

I realize that considerable variation is possible in the details of construction and arrangement of parts without departing from the spirit of my invention, and I therefore do not intend to limit myself to the specific form shown and described.

Having thus described my invention what I claim as new and desire to secure by Letters Patent is:

1. In an automatic check valve for inflammable gases and the like, the combination with a valve chamber provided with inlet and outlet openings, the outlet opening being located in the side and the inlet opening in the bottom of the chamber, a valve seat located in the chamber above the inlet opening, a cap for the top of the chamber provided with an extension extending upwardly from the central portion thereof and closed at its upper end, a ball valve of weight sufficient to seat itself on the valve seat against the gas pressure flowing through the inlet opening, a stem extending upwardly from the ball valve and into the extension of the cap, and a fusible metal lining interposed between the cap and the valve stem and surrounding a substantial portion of the length of said stem whereby such stem is united to the interior of the extension.

2. In an automatic check valve for inflammable gases and the like, the combination with a valve chamber provided with inlet and outlet openings, the outlet opening being located in the side and the inlet opening in the bottom of the chamber, a valve seat located in the chamber above the inlet opening, a cap for the top of the chamber provided with an extension extending upwardly from the central portion thereof and closed at its upper end, a ball valve of weight sufficient to seat itself on the valve seat against the gas pressure flowing through the inlet opening, a stem extending upwardly from the ball valve and into the extension of the cap, a fusible metal lining interposed between the cap and the valve stem and surrounding a substantial portion of the length of said stem whereby such stem is united to the interior of the extension, and a spring interposed between the cap and the body of the valve and surrounding the valve stem.

In testimony whereof, I affix my signature, in presence of two witnesses.

HENRY B. MIGLIAVACCA.

Witnesses:
   ED. HENRY,
   J. B. LAMOIN.